(12) United States Patent
Zhao et al.

(10) Patent No.: US 10,999,377 B2
(45) Date of Patent: May 4, 2021

(54) METHOD, DEVICE AND COMPUTER PROGRAM PRODUCT FOR PROTOCOL SELECTION

(71) Applicant: EMC IP Holding Company LLC, Hopkinton, MA (US)

(72) Inventors: Junping Zhao, Beijing (CN); Zhi Ying, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 42 days.

(21) Appl. No.: 16/173,018

(22) Filed: Oct. 29, 2018

(65) Prior Publication Data
US 2019/0173960 A1 Jun. 6, 2019

(30) Foreign Application Priority Data
Oct. 27, 2017 (CN) .......................... 201711022558.X (51) Int. Cl.
*H04L 29/06* (2006.01)
*H04L 29/08* (2006.01)

(52) U.S. Cl.
CPC ............ *H04L 67/141* (2013.01); *H04L 69/18* (2013.01)

(58) Field of Classification Search
CPC .............................. H04L 69/18; H04L 67/141
USPC ........................................................ 709/220
See application file for complete search history.

(56) References Cited

U.S. PATENT DOCUMENTS

| | | | |
|---|---|---|---|
| 10,212,224 B2* | 2/2019 | Kjendal | H04L 43/12 |
| 2007/0226750 A1* | 9/2007 | Sharp | H04L 67/1097 |
| | | | 719/313 |
| 2008/0002681 A1* | 1/2008 | Bajic | H04W 88/14 |
| | | | 370/389 |
| 2011/0105028 A1 | 5/2011 | Yu et al. | |
| 2012/0124200 A1* | 5/2012 | Ramadass | H04L 63/1408 |
| | | | 709/224 |
| 2013/0215213 A1* | 8/2013 | Power | H04N 7/15 |
| | | | 348/14.02 |
| 2017/0085683 A1* | 3/2017 | Herr | H04L 43/0894 |

FOREIGN PATENT DOCUMENTS

| | | |
|---|---|---|
| CN | 1753404 A | 3/2006 |
| CN | 102640540 A | 8/2012 |
| CN | 105812444 A | 7/2016 |
| CN | 101330501 A | 12/2018 |

* cited by examiner

*Primary Examiner* — Kevin T Bates
*Assistant Examiner* — Chen-Liang Huang
(74) *Attorney, Agent, or Firm* — Ryan, Mason & Lewis, LLP (57) ABSTRACT

Embodiments of the present disclosure relate to a method, device and computer program product for protocol selection. According to embodiments of the present disclosure, a client may determine supported transmission protocols based on its own hardware information and transmit a connection request to a server using a protocol with a higher priority. The server may determine supported protocols based on its own hardware information and respond to the connection request according to the supported protocols. In this way, the establishment of the connection between the client and the server is transparent to users.

20 Claims, 8 Drawing Sheets

METHOD, DEVICE AND COMPUTER PROGRAM PRODUCT FOR PROTOCOL SELECTION

RELATED APPLICATIONS

This application claims priority from Chinese Patent Application Number CN 201711022558.X, filed on Oct. 27, 2017 at the State Intellectual Property Office, China, titled "METHOD, DEVICE AND COMPUTER-READABLE MEDIUM FOR SELECTING PROTOCOL" the content of which is herein incorporated by reference in its entirety.

FIELD

Embodiments of the present disclosure generally relate to protocol selection, and more specifically, to a method and device for protocol selection.

BACKGROUND

Hybrid networks exist in current communication networks. For example, Ethernet, Internet Protocol over Infini-Band (IPoIB) networks, RDMA over Converged Ethernet (RoCE) and Internet Wide-area RDMA Protocol (iWARP) networks may exist in communication networks. Regarding Ethernet, IPoIB and RoCE, they usually use a Transmission Control Protocol (TCP). Regarding Ethernet, IPoIB, RoCE and iWARP, they may use a Remote Direct Memory Access (RDMA) protocol. In some hybrid networks, the use of the RDMA protocol, TCP and other protocol may co-exist.

SUMMARY

Embodiments of the present disclosure provide a method and device for protocol selection and a corresponding computer program product.

According to a first aspect of the present disclosure, there is provided a method implemented at a first device. The method comprises: determining, based on hardware information of the first device, protocols supported by the first device; selecting a target protocol from the protocols based on priorities of the protocols; and transmitting, to a second device, a request for connection establishment using the target protocol.

According to a second aspect of the present disclosure, there is provided a method implemented at a second device. The method comprises: determining, based on hardware information of the second device, protocols supported by the second device; receiving, from a first device, a request for connection establishment, the connection establishment request being sent using a target protocol, the target protocol being determined based on priorities of protocols supported by the first device; and transmitting, to the first device, an acknowledgment to the request for connection establishment based on the protocols supported by the second device and the target protocol.

According to a third aspect of the present disclosure, there is provided a first device. The device comprises: at least one processor; and a memory coupled to the at least one processor, the memory having instructions stored thereon, the instructions, when executed by the at least one processor, causing an electronic device to perform acts including: determining, based on hardware information of the first device, protocols supported by the first device; selecting a target protocol from the protocols based on priorities of the protocols; and transmitting, to a second device, a request for connection establishment using the target protocol.

According to a fourth aspect of the present disclosure, there is provided a second device. The device comprises: at least one processor; and a memory coupled to the at least one processor, the memory having instructions stored thereon, the instructions, when executed by the at least one processor, causing an electronic device to perform acts including: determining, based on hardware information of the second device, protocols supported by the second device; receiving, from a first device, a request for connection establishment the connection establishment request being transmitted using a target protocol, the target protocol being determined based on priorities of protocols supported by the first device; and transmitting, to the first device, an acknowledgment to the request for connection establishment based on the protocols supported by the second device and the target protocol.

In a fifth aspect of the present disclosure, there is provided a computer readable medium. The computer readable medium is stored with machine executable instructions thereon, the instructions, when executed by at least one processing unit of a machine, causing the machine to implement the method according to the first and second aspects.

The Summary provided here is to introduce a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

Through the following more detailed description of example embodiments of the present disclosure with reference to the accompanying drawings, the above and other objectives, features, and advantages of the present disclosure will become more apparent, where the same reference sign usually refers to the same component in the example embodiments of the present disclosure.

DETAILED DESCRIPTION OF EMBODIMENTS

The example embodiments of the present disclosure will be described in more detail with reference to the drawings. Although the drawings illustrate the example implementations of the present disclosure, it should be appreciated that the present disclosure can be implemented in various manners and should not be limited to the implementations explained herein. On the contrary, the implementations are provided to make the present disclosure more thorough and complete and to fully convey the scope of the present disclosure to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The terms "one example embodiment" and "one embodiment" are to be read as "at least one example embodiment." The term "a further embodiment" is to be read as "at least a further embodiment." The terms "first", "second" and so on can refer to same or different objects. The following text also can comprise other explicit and implicit definitions.

As described above, there exists a wide variety of transmission protocols such as TCP and RDMA in current networks. Therefore, there may be networks that only support TCP or RDMA, and also networks that concurrently support multiple protocols. Generally, RDMA requires a better-performance environment, so hybrid networks supporting multiple communication protocols concurrently are not so common. However, with the development of cloud services, hybrid networks tend to be more popular. Traditionally, if the client supports multiple protocols concurrently, configuration needs to be displayed to a user for selection. This degrades efficiency, and meanwhile, perhaps the optimum transmission protocol cannot be used.

To at least partially solve the above and other potential problems and drawbacks, embodiments of the present disclosure provide a method for protocol selection.

Figure 1:
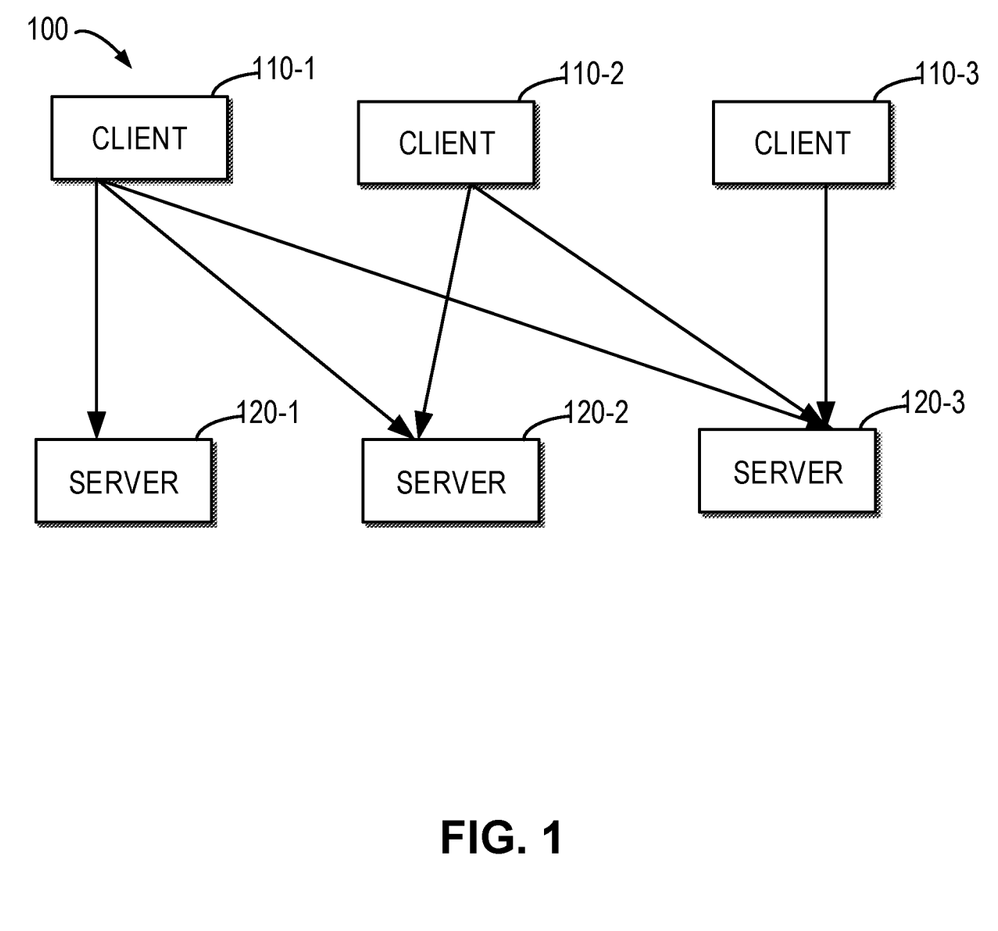
FIG. 1 shows a schematic block diagram of a network structure according to embodiments of the present disclosure.

FIG. 1 shows a schematic block diagram of a network structure 100 according to embodiments of the present disclosure. The network structure 100 comprises a first device and a second device. It should be noted that, only for the purpose of illustrations, the first device refers to a client and the second device refers to a server hereinafter. It may be understood that in some embodiments, the first device may refer to a server while the second device may refer to a client. The network structure 100 comprises a client 110-1, a client 110-2, a client 110-3, ..., a client 110-N (collectively referred to as a client 110, where N is a natural number larger than 1), as well as a server 120-1, a server 120-2, a server 120-3, ..., a server 120-N (collectively referred to as a server 120, where N is a natural number larger than 1). It may be understood that the respective numbers of the clients 110 and the servers 120 shown in FIG. 1 are merely illustrative rather than limiting.

According to embodiments of the present disclosure, the client 110 may determine transmission protocols supported by itself based on its own hardware information, and transmit a connection request to the server 120 using a protocol with a higher priority. The server 120 may determine protocols supported by itself based on its own hardware information, and respond to the connection request according to a supported protocol. In this way, a connection establishment between the client 110 and the server 120 is transparent to users. It should be noted that TCP and RDMA are taken as examples hereinafter only for the purpose of illustrations. It may be understood that embodiments according to the present disclosure may comprise any suitable protocols, such as the Network News Transfer Protocol, the Point-to-Point Protocol, the NetBIOS Enhanced User Interface (NetBEUI), and the like.

Figure 2:
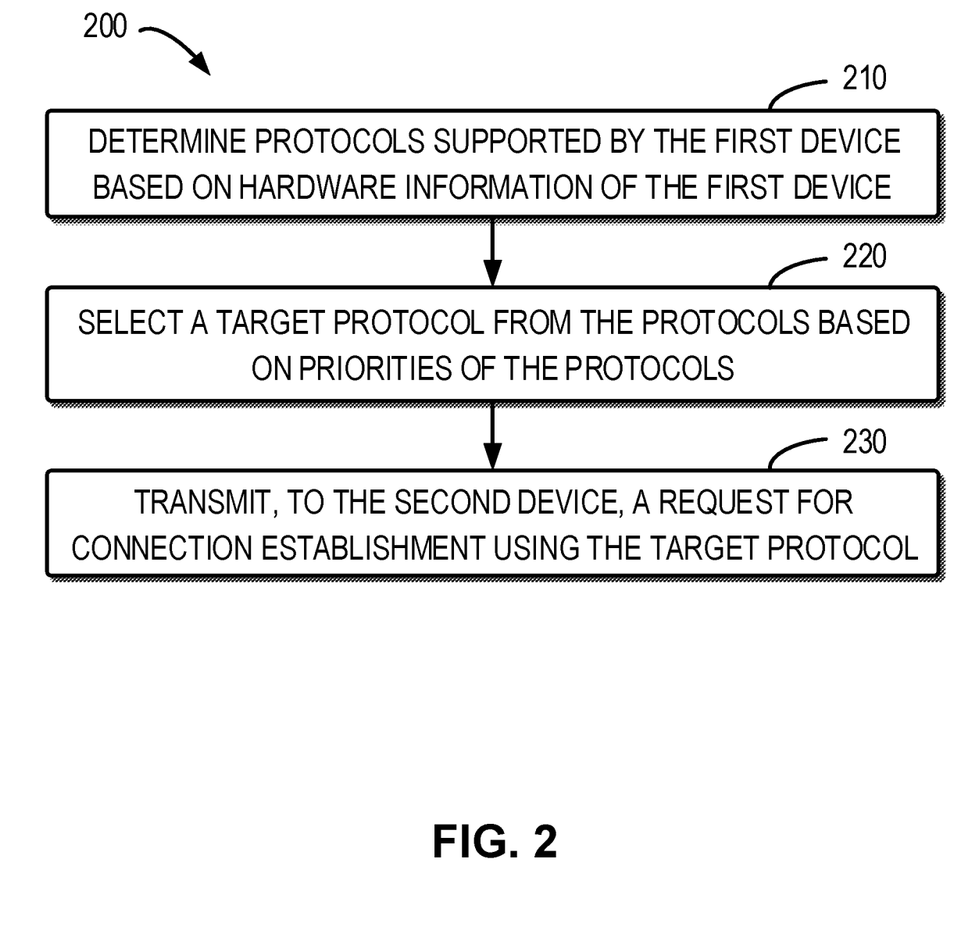
FIG. 2 shows a flowchart of a procedure or method for protocol selection according to embodiments of the present disclosure.

FIG. 2 shows a flowchart of a method 200 for protocol selection according to embodiments of the present disclosure. The method 200 may be implemented at the client 110 shown in FIG. 1. The method 200 may also be implemented at the server 120 shown in FIG. 1. As described above, only for the purpose of illustrations, the first device refers to the client 110, and the second device refers to the server 120. As an example only, the method 200 is implemented at the client 110 herein.

Figure 3:
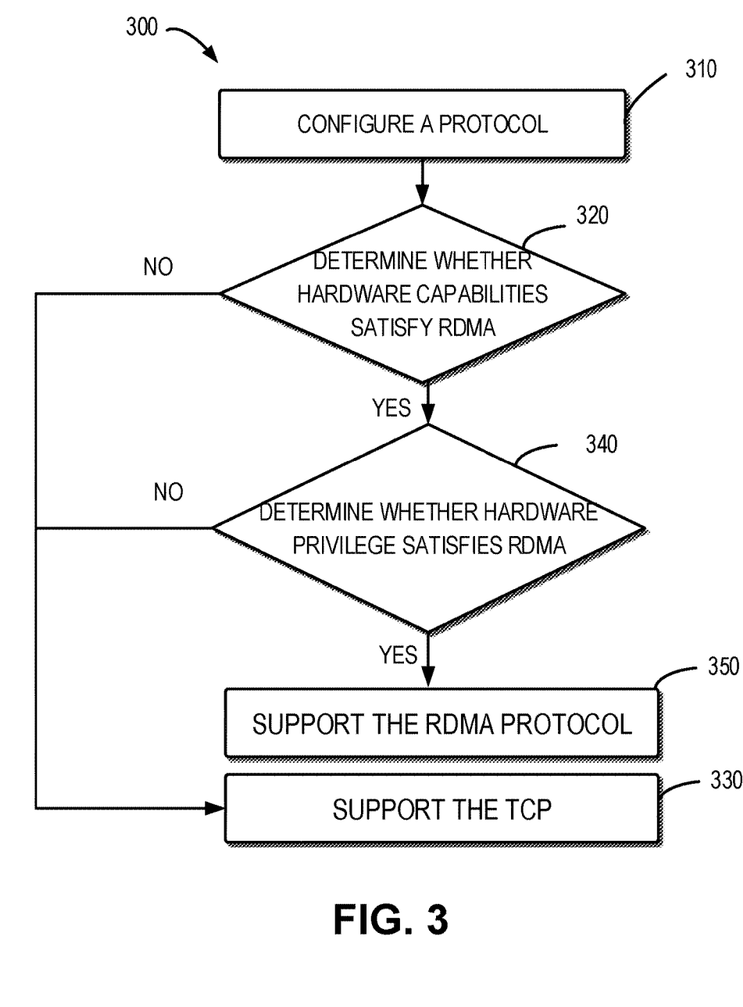
FIG. 3 shows a flowchart of a procedure or method for protocol determining according to embodiments of the present disclosure.

At block 210, the client 110 determines protocols supported by itself based on hardware information of the client 110. Different transmission protocols may be provided with different requirements of hardware capability. For example, the RDMA protocol usually requires special hardware, such as an adaptor or a network card. Therefore, the client 110 may determine supported protocols based on its own hardware information (for example, the hardware type). With reference to FIG. 3, an example implementation of the block 210 is further described below.

At block 310, the client 110 may load protocol configurations. For example, the client 110 may receive instructions from a customer to load the protocol configurations. In a further example embodiment, the client 110 may load the protocol configurations according to pre-stored configuration information.

At block 320, the client 110 may determine whether its hardware capability satisfies the RDMA protocol. For example, as described above, the RDMA protocol requires hardware such as a special network card or adaptor, and the client 110 may check its own hardware based on a predefined RDMA hardware list to determine whether it supports the RDMA protocol. As an example, the hardware list may be defined by a user or obtained from a vendor.

If at block 320 the client 110 determines that its hardware capability does not satisfy the RDMA protocol, then at block 330 the client 110 may determine that it supports the TCP protocol. If at block 320 the client 110 determines that its hardware capability satisfies the RDMA protocol, then at block 340 the client 110 determines whether its hardware privilege satisfies the RDMA protocol. For example, in some embodiments, since the RDMA protocol needs root to register the memory, the client 110 may check whether the root level privilege is available.

If at block 340 the client 110 determines its hardware privilege satisfies the RDMA protocol, then at block 350 the client 110 determines it supports the RDMA protocol. If at block 340 the client 110 determines its hardware privilege does not satisfy the RDMA protocol, then the client 110 may determine it supports the TCP protocol.

It should be understood that the above description of FIG. 3 is merely an example, and embodiments of the present disclosure are not limited in this aspect. According to requirements of a separate protocol on hardware capability and privilege, the client 110 may check whether corresponding hardware supports the protocol.

In some embodiments, the client 110 may create threads associated with the protocol supported by the client 110. For example, the client 110 may create control threads to coordinate protocol negotiation and a connection request, and create worker threads for actual connection request sending and handling. By way of an example, the client 110 determines at block 210 that supported protocols are TCP and RDMA protocol, so the client 110 may create one control thread for each of TCP and RDMA protocol and bind the two control threads to the same port. The client 110 may create multiple worker threads, each of which is bound to a specific port with both RDMA and TCP protocols with portal Uniform Resource Locators (URL). The portal URL includes the protocol identifiers (for example, "rdma," "tcp" or "hybrid"). Each worker thread may register a set of callback functions with each portal URL for task handling.

Referring back to FIG. 2, at block 220, the client 110 selects a target protocol from the protocols based on priorities of the protocols. In one example embodiment, the client 110 may determine priorities of the protocols according to pre-configured information. For example, since the RDMA protocol has such advantages as low latency and less memory consumption and processing resources over the TCP, the RDMA protocol may be provided with a higher priority than TCP. In another example embodiment, the client 110 may determine priorities of the protocols according to user preferences regarding protocols. In a further embodiment, the client 110 may determine priorities of the protocols according to historical information associated with protocol usage.

In some embodiments, the client 110 may select from the protocols one with a high priority as the target protocol. For example, if the client 110 supports both the RDMA and TCP protocols and the RDMA protocol has a higher priority, then the client 110 may select the RDMA protocol.

At block 230, the client 110 may transmit a connection request to the server 120 using the target protocol. For example, the client 110 may transmit a request for RDMA negotiation to the server 120.

In one example embodiment, if the client 110 receives from the server 120 a positive acknowledgment to the request for connection establishment, then the client 110 establishes a connection with the server 120 using the target protocol. In another example embodiment, if the client 110 receives from the server 120 a negative acknowledgment to the request for connection establishment, then the client 110 establishes a connection with the server 120 using a protocol with a lower priority. As an example only, if the client 110 receives from the server 120 a negative acknowledgment to an RDMA protocol connection, then the client 110 may utilize the TCP protocol to establish a connection with the server 120.

In this way, the establishment of a connection between the client 110 and the server 120 is transparent to users, which effectively increase the efficiency of connection establishment. Meanwhile, the optimum connection is realized.

Figure 4:
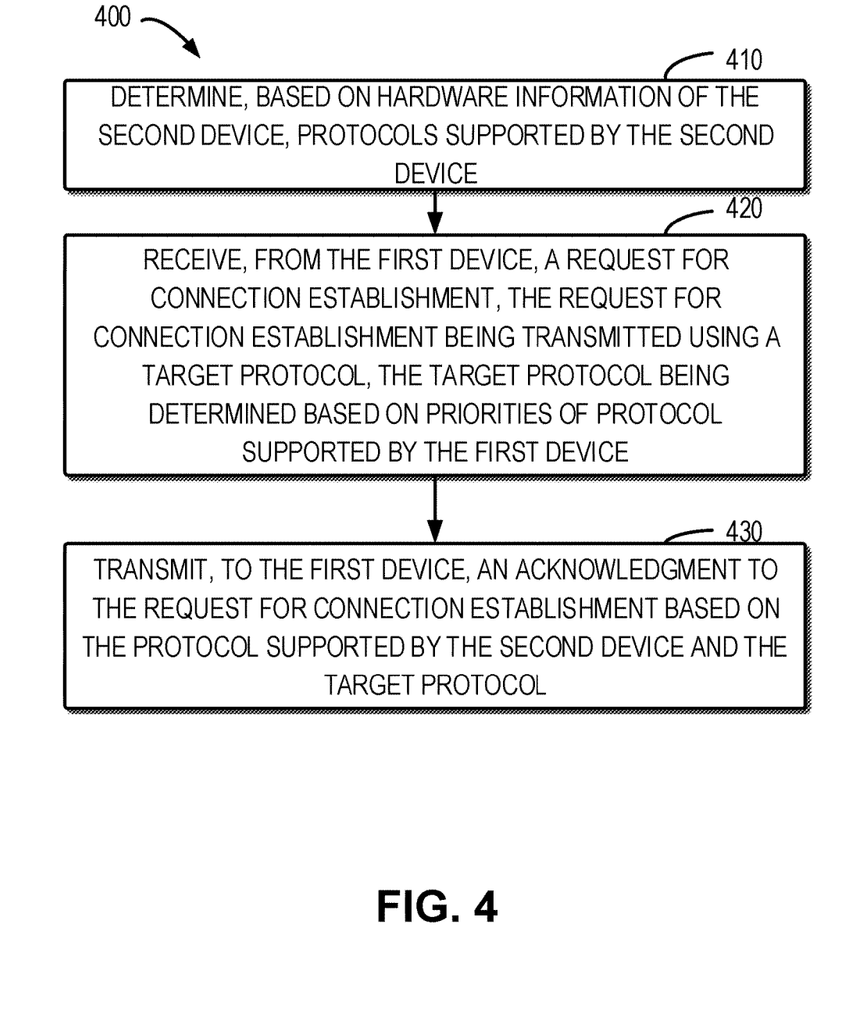
FIG. 4 shows a flowchart of a procedure or method for protocol selection according to embodiments of the present disclosure.

FIG. 4 shows a flowchart of a method 400 for protocol selection according to embodiments of the present disclosure. The method 400 may be implemented at the server 120 shown in FIG. 1. The method 400 may also be implemented at the client 110 shown in FIG. 1. As described above, for the purpose of illustration only, the first device refers to the client 110, and the second device refers to the server 120. As an example only, the method 400 is implemented at the server 120 hereinafter.

At block 410, the server 120 determines protocols supported by itself based on hardware information of the server 120.

The server 120 may determine the supported protocols based on the method described with reference to FIG. 3 above. In some embodiments, at block 310, the server 120 may load protocol configurations. For example, the server 120 may receive instructions from a customer to load the protocol configurations. In a further example embodiment, the server 120 may load the protocol configurations according to pre-stored configuration information.

At block 320, the server 120 may determine whether its hardware capability satisfies the RDMA protocol. For example, as described above, the RDMA protocol requires hardware such as a special network card or adaptor, and the server 120 may check its own hardware based on a pre-defined RDMA hardware list to determine whether it supports the RDMA protocol. As an example, the hardware list may be defined by a user or obtained from a vendor.

If at block 320 the server 120 determines that its hardware capability does not satisfy the RDMA protocol, then at block 330 the server 120 may determine that it supports the TCP protocol. However, if at block 320 the server 120 determines that its hardware capability can satisfy the RDMA protocol, then at block 340 the server 120 determines whether its hardware privilege satisfies the RDMA protocol. For example, in some embodiments, since the RDMA protocol needs root to register the memory, the server 120 may check whether root level privilege is available.

If at block 340 the server 120 determines its hardware privilege satisfies the RDMA protocol, then at block 350 the server 120 determines it supports the RDMA protocol. If at block 340 the server 120 determines its hardware privilege does not satisfy the RDMA protocol, then the serer 120 may determine it supports the TCP protocol.

It should be noted that the above description of FIG. 3 is merely an example, and embodiments of the present disclosure are not limited in this aspect. According to requirements of a separate protocol on hardware capability and privilege, the server 120 may check whether corresponding hardware supports the protocol.

In some embodiments, the server 120 may create threads associated with the protocol supported by the server 120. For example, the server 120 may create control threads to coordinate protocol negotiation and a connection request, and create worker threads for actual connection request sending and handling. By way of an example, the server 120 determines at block 410 that supported protocols are both TCP and RDMA protocols, so the server 120 may create one control thread for each of TCP and RDMA and bind the two control threads to the same port. The server 120 may create multiple worker threads, each of which is bound to a specific port with both RDMA and TCP protocols with portal URLs. The portal URL includes the protocol identifiers (e.g. "rdma," "tcp" or "hybrid"). Each worker thread will register a set of callback functions with each portal URL for task handling.

Referring back to FIG. 4, at block 420, the server 120 may receive a request for connection establishment from the client 110. The request for connection establishment is transmitted using a target protocol, which is determined based on priorities of protocols supported by the client 110. As described above, the server 120 may create threads associated with the protocols supported by the server 120. If the client 110 transmits the connection request to the server 120 using the RDMA protocol, then a control thread created by the server 120 for the RDMA protocol will receive the request, and the control thread redirects the request to a worker thread. The redirected URL is crafted according to a connection protocol. The worker thread that has received the request will get a set of callback functions registered with corresponding portal URLs and handle the request.

At block 430, the server 120 transmits an acknowledgment to the connection establishment request to the client 110 based on the protocols supported by the server and the target protocol.

In one example embodiment, if the server 120 supports the target protocol, then the server 120 may transmit a positive acknowledgment to the request to the client 110. In another example embodiment, if the server 120 does not support the target protocol, then the server 120 may transmit a negative acknowledgment to the request to the client 110. As an example only, if the server 120 receives from the client a request for connection establishment which is transmitted using the RDMA protocol, and the server 120 does not support the RDMA protocol, then the server 120 transmits a negative acknowledgment to the client 110.

Figure 5A:
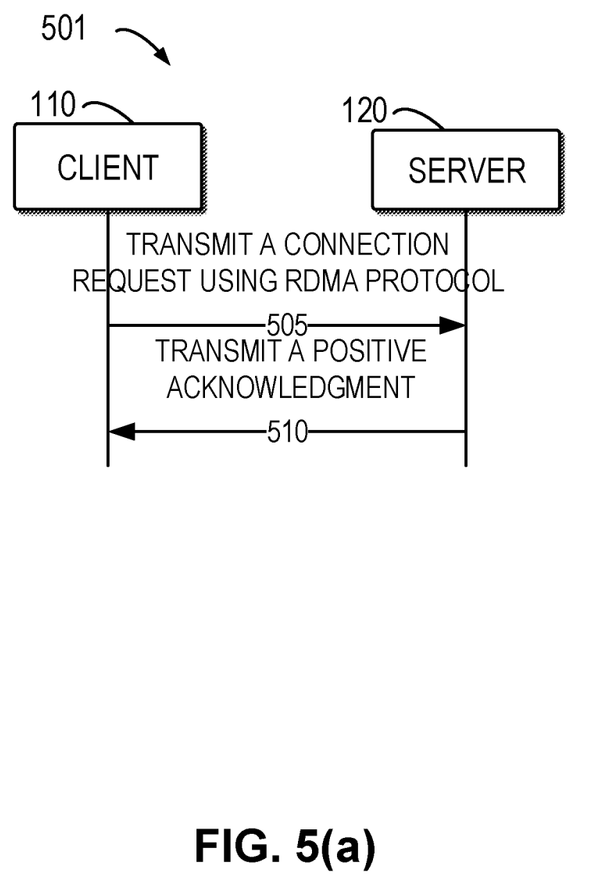
FIGS. 5(a) and 5(b) each shows a diagram of interaction according to embodiments of the present disclosure.
Figure 5B:
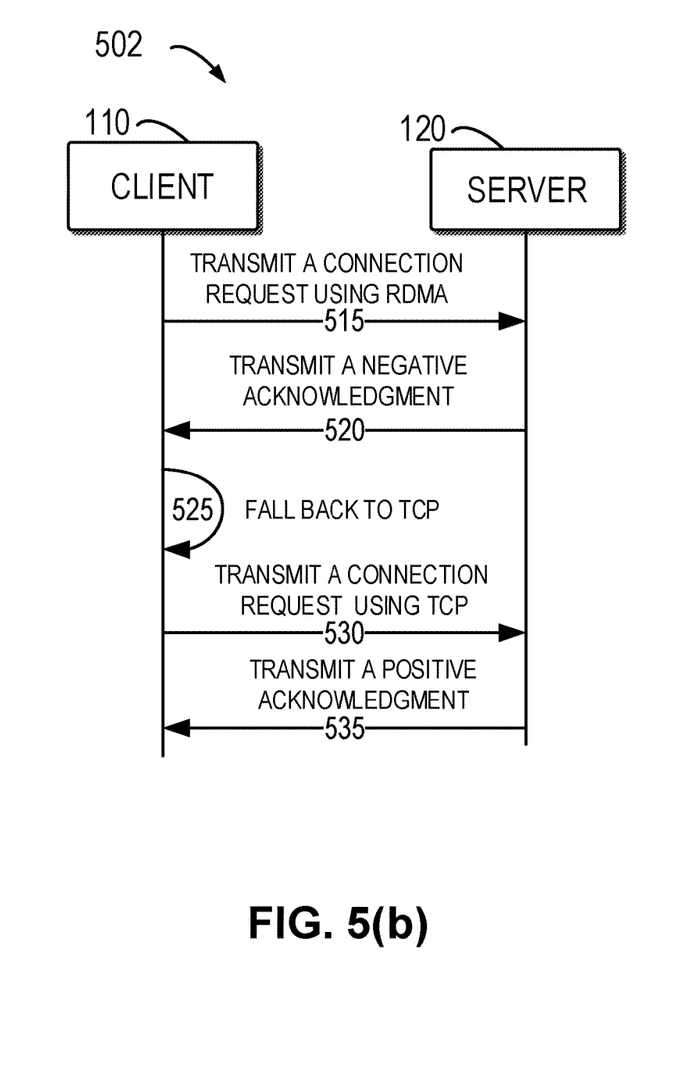

FIGS. 5(*a*) and 5(*b*) show interactions 501 and 502 according to some embodiments of the present disclosure, respectively. It should be noted that the interactions shown in FIGS. 5(*a*) and 5(*b*) are merely examples. In the example of FIG. 5(*a*), the interaction 501 shows a procedure in which the client 110 and the server 120 establish a connection using the RDMA protocol. As depicted, the client 110 transmits 505 a connection request to the server 120 using the RDMA protocol. The server 120 supports RDMA and transmits 510 a positive acknowledgment to the client 110. In this way, the client 110 and the server 120 establish a connection using the RDMA protocol.

In the example of FIG. 5(*b*), the interaction 502 shows a procedure in which the client 110 and the server 120 establish a connection using the TCP protocol. If the client 110 supports both RDMA and TCP, then the client 110 may first transmit 515 a connection request to the server 120 using RDMA. The server 120 does not support RDMA and transmit 520 a negative acknowledgment to the client 110. The client 110 falls back 525 to TCP and transmits 530 a connection request to the server 120 using the TCP protocol. The server 120 supports TCP and transmits 535 a positive acknowledgment to the client 110. In this way, the client 110 and the server 120 establish a connection using the TCP protocol.

Figure 6:
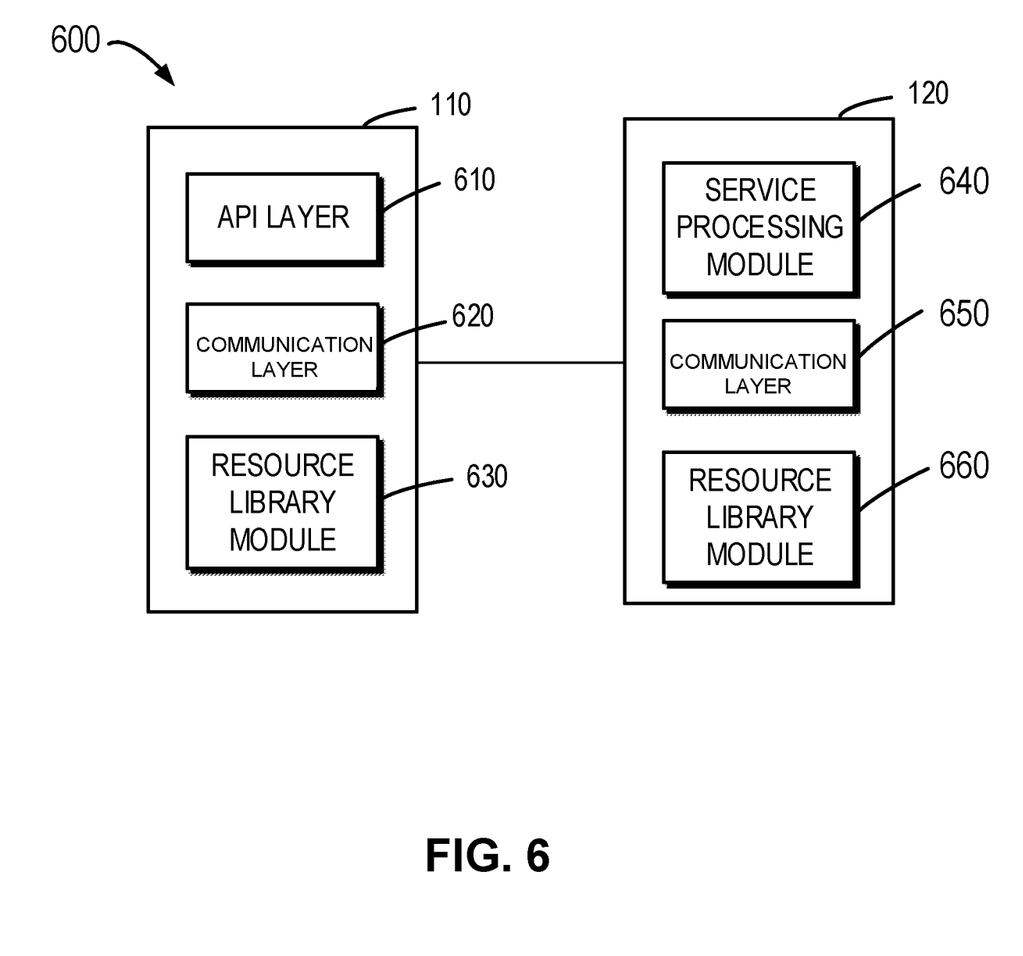
FIG. 6 shows a schematic block diagram of a network structure according to embodiments of the present disclosure.

FIG. 6 shows a schematic block diagram of a network structure according to some embodiments of the present disclosure. As an example only, as depicted, the client 110 comprises an application program interface (API) layer 610, a communication layer 620 and a resource library module 630. The API layer 610 is configured to receive a user request. The communication layer 620 is configured to execute the methods as shown in FIGS. 2 to 4. The communication layer 620 is further configured to send a device driver message. The resource library module 630 comprises low-level communication drivers and TCP/IP drivers, etc., and is configured to re-wrap the user request and send the same to the server 120.

In some embodiments, the server 120 comprises a service processing module 640, a communication layer 650 and a resource library module 660. The handling module 640 is configured to handle a request from the client 110. The communication layer 650 is configured to execute the methods as shown in FIGS. 2 to 4. The communication layer 650 is further configured to transmit a device driver message. The resource library module 660 comprises low-level communication drivers and TCP/IP drivers, etc., and is configured to re-wrap the received request.

Figure 7:
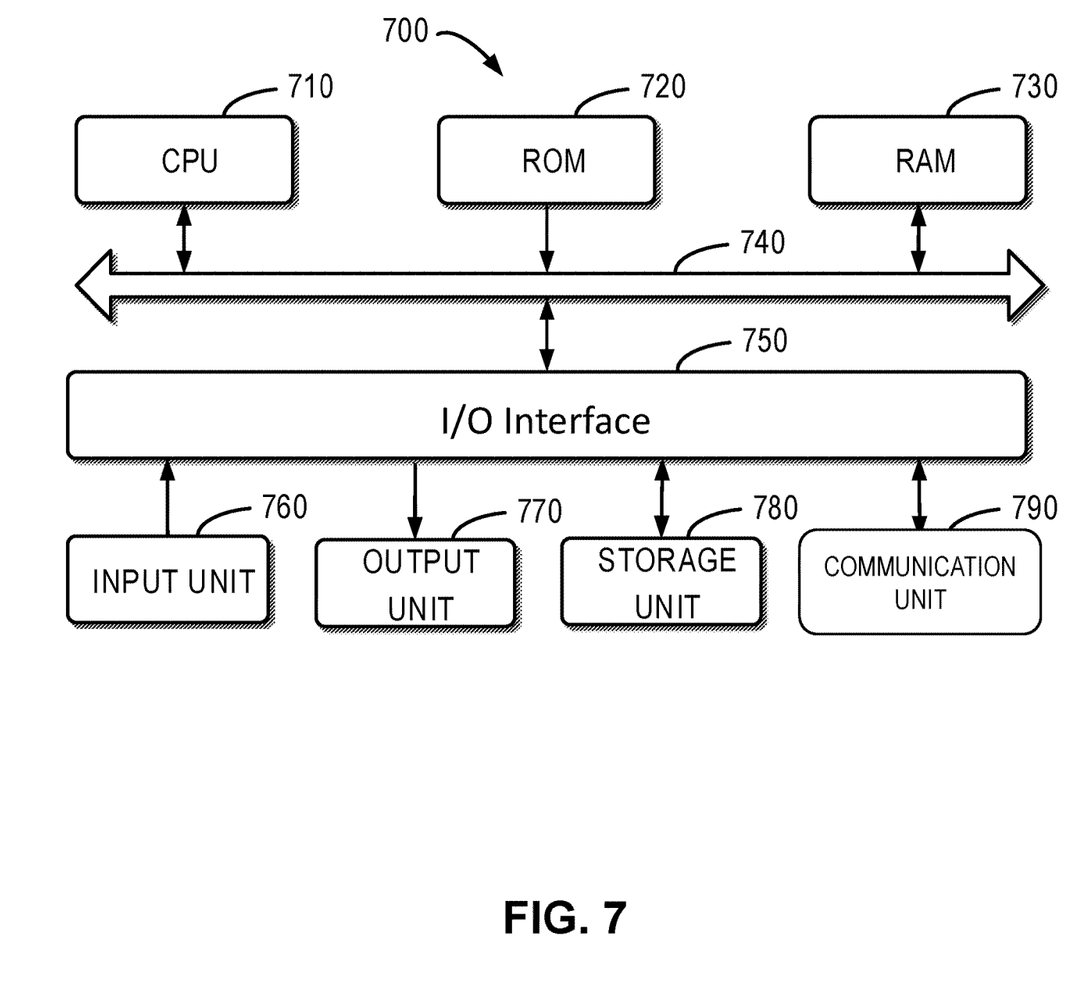
FIG. 7 shows a schematic block diagram of a device according to embodiments of the present disclosure.

FIG. 7 illustrates a schematic block diagram of an electronic device 700 for implementing embodiments of the present disclosure. It may be understood that the electronic device 700 may be implemented at the client 110 or the server 120 shown in FIG. 1. As shown, the device 700 includes a central process unit (CPU) 710, which can execute various suitable actions and processing based on the computer program instructions stored in the read-only memory (ROM) 720 or computer program instructions loaded in the random-access memory (RAM) 730 from a storage unit 780. The RAM 730 can also store all kinds of programs and data required by the operations of the device 700. CPU 710, ROM 720 and RAM 730 are connected to each other via a bus 740. The input/output (I/O) interface 750 is also connected to the bus 740.

A plurality of components in the device 700 is connected to the I/O interface 750, including: an input unit 760, such as keyboard, mouse and the like; an output unit 770, for example, various kinds of display and loudspeakers and the like; a storage unit 780, such as disk and optical disk and the like; and a communication unit 790, such as network card, modem, wireless transceiver and the like. The communication unit 790 allows the device 700 to exchange information/data with other devices via the computer network, such as Internet, and/or various telecommunication networks.

The above described each procedure and processing, such as the procedures 200, 300 and 400, can also be executed by the processing unit 710. For example, in some embodiments, the procedures/methods 200, 300 and 400 can be implemented as a computer software program tangibly included in the machine-readable medium, e.g., storage unit 780. In some embodiments, the computer program can be partially or fully loaded and/or mounted to the device 700 via ROM 720 and/or communication unit 790. When the computer program is loaded to RAM 730 and executed by the CPU 710, one or more actions of the above described methods 200, 300 and 400 can be implemented.

The present disclosure can be method, device and/or computer program product. The computer program product can include a computer-readable storage medium, on which the computer-readable program instructions for executing various aspects of the present disclosure are loaded.

The computer-readable storage medium can be a tangible apparatus that maintains and stores instructions utilized by the instruction executing apparatuses. The computer-readable storage medium can be, but not limited to, such as electrical storage device, magnetic storage device, optical storage device, electromagnetic storage device, semiconductor storage device or any appropriate combinations of the above. More concrete examples of the computer-readable storage medium (non-exhaustive list) include: portable computer disk, hard disk, random-access memory (RAM), read-only memory (ROM), erasable programmable read-only memory (EPROM or flash), static random-access memory (SRAM), portable compact disk read-only memory (CD-ROM), digital versatile disk (DVD), memory stick, floppy disk, mechanical coding devices, punched card stored with instructions thereon, or a projection in a slot, and any appropriate combinations of the above. The computer-readable storage medium utilized here is not interpreted as transient signals per se, such as radio waves or freely propagated electromagnetic waves, electromagnetic waves propagated via waveguide or other transmission media (such as optical pulses via fiber-optic cables), or electric signals propagated via electric wires.

The described computer-readable program instruction can be downloaded from the computer-readable storage medium to each computing/processing device, or to an external computer or external storage via Internet, local area network, wide area network and/or wireless network. The network can include copper-transmitted cable, optical fiber transmission, wireless transmission, router, firewall, switch, network gate computer and/or edge server. The network adapter card or network interface in each computing/processing device receives computer-readable program instructions from the network and forwards the computer-readable program instructions for storage in the computer-readable storage medium of each computing/processing device.

The computer program instructions for executing operations of the present disclosure can be assembly instructions, instructions of instruction set architecture (ISA), machine instructions, machine-related instructions, microcodes, firmware instructions, state setting data, or source codes or target codes written in any combinations of one or more programming languages, wherein the programming languages consist of object-oriented programming languages, for example, Smalltalk, C++ and so on, and traditional procedural programming languages, such as "C" language or similar programming languages. The computer-readable program instructions can be implemented fully on the user computer, partially on the user computer, as an independent software package, partially on the user computer and partially on the remote computer, or completely on the remote computer or server. In the case where remote computer is involved, the remote computer can be connected to the user computer via any type of networks, including local area network (LAN) and wide area network (WAN), or to the external computer (e.g., connected via Internet using the Internet service provider). In some embodiments, state information of the computer-readable program instructions is used to customize an electronic circuit, e.g., programmable logic circuit, field programmable gate array (FPGA) or programmable logic array (PLA). The electronic circuit can execute computer-readable program instructions to implement various aspects of the present disclosure.

Various aspects of the present disclosure are described here with reference to flow chart and/or block diagram of method, apparatus (device) and computer program products according to embodiments of the present disclosure. It should be understood that each block of the flow chart and/or block diagram and the combination of various blocks in the flow chart and/or block diagram can be implemented by computer-readable program instructions.

The computer-readable program instructions can be provided to the processor of general-purpose computer, dedicated computer or other programmable data processing apparatuses to manufacture a machine, such that the instructions that, when executed by the processor of the computer or other programmable data processing apparatuses, generate an apparatus for implementing functions/actions stipulated in one or more blocks in the flow chart and/or block diagram. The computer-readable program instructions can also be stored in the computer-readable storage medium and cause the computer, programmable data processing apparatus and/or other devices to work in a particular manner, such that the computer-readable medium stored with instructions contains an article of manufacture, including instructions for implementing various aspects of the functions/actions stipulated in one or more blocks of the flow chart and/or block diagram.

The computer-readable program instructions can also be loaded into computer, other programmable data processing apparatuses or other devices, so as to execute a series of operation steps on the computer, other programmable data processing apparatuses or other devices to generate a computer-implemented procedure. Therefore, the instructions executed on the computer, other programmable data processing apparatuses or other devices implement functions/actions stipulated in one or more blocks of the flow chart and/or block diagram.

The flow chart and block diagram in the drawings illustrate system architecture, functions and operations that may be implemented by method, device and computer program product according to multiple implementations of the present disclosure. In this aspect, each block in the flow chart or block diagram can represent a module, a part of program segment or code, wherein the module and the part of program segment or code include one or more executable instructions for performing stipulated logic functions. In some alternative implementations, it should be noted that the functions indicated in the block can also take place in an order different from the one indicated in the drawings. For example, two successive blocks can be in fact executed in parallel or sometimes in a reverse order dependent on the involved functions. It should also be noted that each block in the block diagram and/or flow chart and combinations of the blocks in the block diagram and/or flow chart can be implemented by a hardware-based system exclusive for executing stipulated functions or actions, or by a combination of dedicated hardware and computer instructions.

Various implementations of the present disclosure have been described above and the above description is only exemplary rather than exhaustive and is not limited to the implementations of the present disclosure. Many modifications and alterations, without deviating from the scope and spirit of the explained various implementations, are obvious for those skilled in the art. The selection of terms in the disclosure aims to best explain principles and actual applications of each implementation and technical improvements made in the market by each embodiment, or enable other ordinary skilled in the art to understand implementations of the present disclosure.

We claim:

1. A method implemented at a first device, comprising:
obtaining hardware information for the first device, the hardware information indicating which protocols of a plurality of protocols the first device is configured to support;
determining, based at least in part on the hardware information, at least a first protocol of the plurality of protocols and a second protocol of the plurality of protocols that are supported by the first device;
establishing a plurality of control threads, each control thread of the plurality of control threads corresponding to one of the protocols of the plurality of protocols that is supported by the first device, the plurality of control threads comprising a first control thread that corresponds to the first protocol and a second control thread that corresponds to the second protocol;
binding the plurality of control threads to a given port of the first device, each control thread being configured to coordinate the servicing of messages transmitted and received over the given port under the corresponding protocol;
establishing a worker thread and binding the worker thread to the given port, the worker thread being configured to service messages that are transmitted and received over the given port under the first and second protocols according to the coordination by the first and second control threads, respectively;
obtaining a first priority level associated with the first protocol and a second priority level associated with the second protocol;
determining that the first priority level is higher than the second priority level;
selecting the first protocol as a target protocol based at least in part on the determination that the first priority level is greater than the second priority level; and
coordinating, by the first control thread, a transmission by the worker thread, to a second device, of a request for connection establishment using the target protocol.

2. The method of claim 1, wherein:
determining that the first and second protocols are supported by the first device comprises:
determining a protocol-related hardware capability of the first device, the protocol-related hardware capability comprising hardware that supports at least the first and second protocols;
determining a protocol-related privilege of the first device, the protocol-related privilege comprising at least one configuration of the first device to support each of the determined protocol-related hardware capabilities; and
determining that the first and second protocols are supported by the first device based at least in part on the determined hardware capability and the determined protocol-related privilege; and the method further comprises:
determining that the protocol-related hardware capability of the first device comprises hardware that supports a third protocol;
determining that the protocol-related privilege of the first device is not configured to support the third protocol; and
determining that the third protocol is not supported by the first device based at least in part on the determination that the protocol-related privilege of the first device is not configured to support the third protocol.

3. The method of claim 1, wherein selecting the first protocol as the target protocol comprises:
determining that the first protocol has the highest priority level of the protocols of the plurality of protocols that the first device is configured to support.

4. The method of claim 1, wherein the first priority level and the second priority level are obtained based at least in part on at least one of:
pre-configured information associated with the priority levels;
a user preference for a given protocol; and
historical information associated with protocol usage.

5. The method of claim 1, further comprising:
in response to receiving, from the second device, a positive acknowledgment to the request for connection establishment, coordinating, by the first control thread, an establishment of a connection with the second device using the target protocol by the worker thread.

6. The method of claim 1, further comprising:
in response to receiving, from the second device, a negative acknowledgment to the request for connection establishment, coordinating, by the second control thread, an establishment of a connection with the second device using the second protocol by the worker thread.

7. The method of claim 1, wherein the protocols comprise at least one of: a Transmission Control Protocol (TCP) and a Remote Direct Memory Access (RDMA) protocol.

8. A method implemented at a second device, comprising:
obtaining hardware information for the second device, the hardware information indicating which protocols of a plurality of protocols the second device is configured to support;
determining, based at least in part on the hardware information, at least one protocol of the plurality of protocols comprising at least a first protocol and a second protocol that are supported by the second device;
establishing a plurality of control threads, each control thread of the plurality of control threads corresponding to one of the protocols of the plurality of protocols that is supported by the second device, the plurality of control threads comprising a first control thread that corresponds to the first protocol and a second control thread that corresponds to the second protocol;
binding the plurality of control threads to a given port of the second device, each control thread being configured to coordinate the servicing of messages transmitted and received over the given port under the corresponding protocol;
establishing a worker thread and binding the worker thread to the given port, the worker thread being configured to service messages that are transmitted and received over the given port under the corresponding protocols according to the coordination by the plurality of control threads, respectively;
receiving, from a first device, a request for connection establishment over the given port, the request for connection establishment being transmitted using a target protocol of the plurality of protocols, the target protocol being determined by the first device based at least in part on a first priority level associated with the first protocol and a second priority level associated with the second protocol;
determining whether or not the target protocol corresponds to the at least one protocol that is supported by the second device; and
coordinating, by one of the control threads, a transmission by the worker thread, to the first device, of an acknowledgment to the request for connection establishment based at least in part on the determination of whether or not the target protocol corresponds to the at least one protocol that is supported by the second device.

9. The method of claim 8, wherein the transmission, to the first device, of the acknowledgment to the request for connection establishment comprises:
in response to determining that the at least one protocol that is supported by the second device corresponds to the target protocol, coordinating, by the one of the control threads, a transmission by the worker thread of a positive acknowledgment to the request to the first device.

10. The method of claim 8, wherein the transmission, to the first device, of the acknowledgment to the request for connection establishment comprises:
in response to determining that the at least one protocol that is supported by the second device does not correspond to the target protocol, coordinating, by the one of the control threads, a transmission by the worker thread of a negative acknowledgment to the request to the first device.

11. A first device, comprising:
at least one processor; and
a memory coupled to the at least one processor, the memory having instructions stored thereon, the instructions, when executed by the at least one processor, causing the first device to perform acts including:
obtaining hardware information for the first device, the hardware information indicating which protocols of a plurality of protocols the first device is configured to support;
determining, based at least in part on the hardware information, at least a first protocol of the plurality of protocols and a second protocol of the plurality of protocols that are supported by the first device;
establishing a plurality of control threads, each control thread of the plurality of control threads corresponding to one of the protocols of the plurality of protocols that is supported by the first device, the plurality of control threads comprising a first control thread that corresponds to the first protocol and a second control thread that corresponds to the second protocol;

binding the plurality of control threads to a given port of the first device, each control thread being configured to coordinate the servicing of messages transmitted and received over the given port under the corresponding protocol;

establishing a worker thread and binding the worker thread to the given port, the worker thread being configured to service messages that are transmitted and received over the given port under the first and second protocols according to the coordination by the first and second control threads, respectively;

obtaining a first priority level associated with the first protocol and a second priority level associated with the second protocol;

determining that the first priority level is higher than the second priority level;

selecting the first protocol as a target protocol based at least in part on the determination that the first priority level is greater than the second priority level; and coordinating, by the first control thread, a transmission by the worker thread, to a second device, of a request for connection establishment using the target protocol.

12. The first device of claim 11, wherein:
determining that the first and second protocols are supported by the first device comprises:
  determining a protocol-related hardware capability of the first device, the protocol-related hardware capability comprising hardware that supports at least the first and second protocols;
  determining a protocol-related privilege of the first device, the protocol-related privilege comprising at least one configuration of the first device to support each of the determined protocol-related hardware capabilities; and
  determining that the first and second protocols are supported by the first device based at least in part on the determined hardware capability and the determined protocol-related privilege; and
the instructions further cause the first device to perform the acts of:
  determining that the protocol-related hardware capability of the first device comprises hardware that supports a third protocol;
  determining that the protocol-related privilege of the first device is not configured to support the third protocol; and
  determining that the third protocol is not supported by the first device based at least in part on the determination that the protocol-related privilege of the first device is not configured to support the third protocol.

13. The first device of claim 11, wherein selecting the first protocol as the target protocol comprises:
  determining that the first protocol has the highest priority level of the protocols of the plurality of protocols that the first device is configured to support.

14. The first device of claim 11, wherein the first priority level and the second priority level are obtained based at least in part on at least one of:
  pre-configured information associated with the priority levels;
  a user preference for a given protocol; and
  historical information associated with protocol usage.

15. The first device of claim 11, wherein the acts further comprise:
  in response to receiving, from the second device, a positive acknowledgment to the request for connection establishment, coordinating, by the first control thread, an establishment of a connection with the second device using the target protocol by the worker thread.

16. The first device of claim 11, wherein the acts further comprise:
  in response to receiving, from the second device, a negative acknowledgment to the request for connection establishment, coordinating, by the second control thread, an establishment of a connection with the second device using the second protocol by the worker thread.

17. The first device of claim 11, wherein the protocols comprise at least one of: a Transmission Control Protocol (TCP) and a Remote Direct Memory Access (RDMA) protocol.

18. The method of claim 1, wherein binding the worker thread to the given port comprises associating the worker thread with corresponding portal information, the portal information comprising at least one callback function for each protocol under which the worker thread is configured to service messages.

19. The method of claim 8, wherein binding the worker thread to the given port comprises associating the worker thread with corresponding portal information, the portal information comprising at least one callback function for each protocol under which the worker thread is configured to service messages.

20. The first device of claim 11, wherein binding the worker thread to the given port comprises associating the worker thread with corresponding portal information, the portal information comprising at least one callback function for each protocol under which the worker thread is configured to service messages.

* * * * *